United States Patent

[11] 3,622,168

| [72] | Inventor | George V. Woodling<br>22077 West Lake Road, Rocky River, Ohio 44116 |
|---|---|---|
| [21] | Appl. No. | 55,383 |
| [22] | Filed | July 16, 1970 |
| [45] | Patented | Nov. 23, 1971 |

[54] ROTARY SHAFT SEAL MEANS
6 Claims, 4 Drawing Figs.

| [52] | U.S. Cl. | 277/168, 277/206.1 |
|---|---|---|
| [51] | Int. Cl. | F16j 9/02, F16r 41/00 |
| [50] | Field of Search | 277/209, 168, 207, 206.1 |

[56] References Cited
UNITED STATES PATENTS

| 3,542,380 | 11/1970 | Klein | 277/206.1 |
|---|---|---|---|
| 2,954,264 | 9/1960 | Tisch et al. | 277/209 |
| 2,873,132 | 2/1959 | Tanner | 277/209 |

*Primary Examiner*—Samuel B. Rothberg
*Attorney*—Woodling, Krost, Granger and Rust ABSTRACT: Fluid seal means for a shaft mounted in annular space surrounding the shaft. The fluid seal comprises an O-ring of rubberlike material having substantially a square cross section, defining first and second end sections with each end section having a pair of crown corners. The pair of crown corners on the first end section constitutes a sealing section. The pair of crown corners on the second end section constitutes a nonsealing section.

PATENTED NOV 23 1971    3,622,168

INVENTOR
GEORGE V. WOODLING
BY
Woodling, Krost, Granger and Rust
attys.

3,622,168

ROTARY SHAFT SEAL MEANS

BACKGROUND OF THE INVENTION

Most elastomers, such as rubberlike O-rings, when heated in a stretched or stressed (garterlike) condition, will contract. The contraction (shrinkage) is damaging because it results in a tendency for the O-ring to squeeze all the harder against the rotating shaft, which self-perpetuates more heat. Continued rotation of the shaft tends to cause the O-ring to seize the shaft, whereupon more friction will cause more heat and the process becomes self-perpetuating until the O-ring is destroyed. This phenomenon is known as the GOW-JOULE effect.

Accordingly, it is an object of my invention to reduce the phenomenon, known as the GOW-JOULE effect.

Another object is to provide a narrow axial contact engagement between the O-ring and the shaft.

Another object is the provision of a shaft seal having a large radial cushion-effect and a small circumferential frictional contact with the shaft.

Another object is the provision of a shaft seal which makes it unnecessary to maintain close manufacturing tolerance in mounting the seal.

Another object of my invention is the provision of a shaft seal including a square cross-sectional type of O-ring having first and second end sections, wherein one of said end sections constitutes a sealing section and the other of said end sections constitutes a nonsealing section.

Another object is to subject said sealing section to both a cross-sectional compression and a circumferential compression.

Another object is to mount the nonsealing section about the shaft with a clearance space therearound.

Another object is to prevent extrusion of the O-ring along the shaft without the use of backup washers.

Another object is the provision of a groove whereby a square type of O-ring with a hardness value of at least substantially 80 Durometer may be inserted therein without difficulty and still circumferentially compress at least one end section of the O-ring.

SUMMARY OF THE INVENTION

My invention constitutes seal means for effecting a fluid seal between a shaft and a surrounding body, said body having a shaft bore through which said shaft extends, said body having body wall means defining a space extending outwardly from said shaft bore and disposed to receive said seal means, said wall means including bottom wall means having first and second bottom wall portion means, said first bottom wall portion means defining with said shaft a first perpendicular depth, said second bottom wall portion means defining with said shaft a second perpendicular depth, said first perpendicular depth being less than said second perpendicular depth, said seal means comprising an O-ring of rubberlike material having an internal annular surface confronting said shaft and provided with first and second raised crown portions spaced apart from each other and including a valley portion therebetween and having an external annular surface confronting said bottom wall means and provided with third and fourth raised crown portions spaced apart from each other and including a valley portion therebetween, said O-ring defining a first end section between said first and third crown portions and a second end section between said second and fourth crown portions, said first end section constituting a sealing section and having a freestate cross-sectional dimension between said first and third crown portions greater than said first perpendicular depth whereby said first end section is under a state of cross-sectional compression, said first crown portion directly confronting and engaging said shaft and defining therewith a fluid seal, said second end section constituting a nonsealing section and having a freestate cross-sectional dimension between said second and fourth crown portions less than said second perpendicular depth, said second crown portion directly confronting said shaft and providing a nonsealing clearance therearound.

BRIEF DESCRIPTION OF THE DRAWINGS

Other objects and a fuller understanding of this invention may be had by referring to the following description and claims, taken in conjunction with the accompanying drawings, in which:

DESCRIPTION OF THE PREFERRED EMBODIMENT

Figure 1:
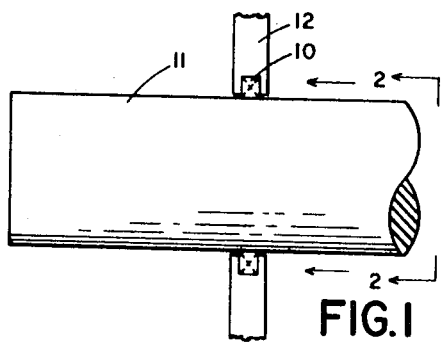
FIG. 1 is a view, diagrammatically illustrating the position in which my shaft seal may be mounted between a shaft and a surrounding body.
Figure 2:
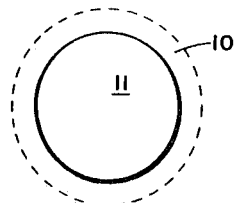
FIG. 2 is an end view of the shaft seal only, looking in the direction of the line 2—2.
Figure 3:
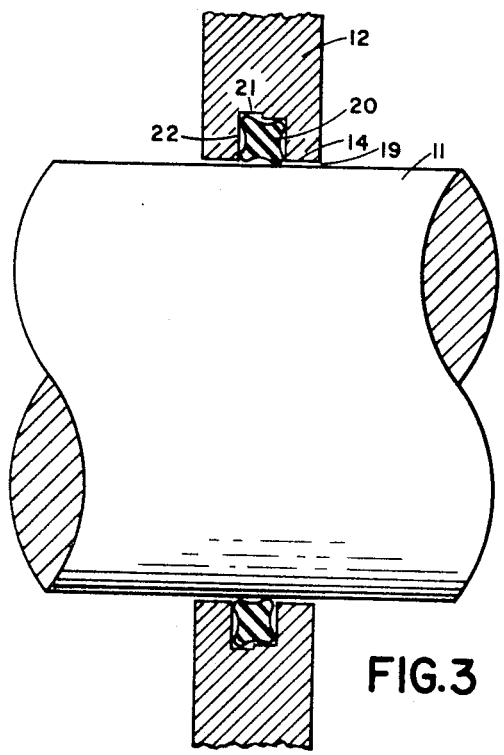
FIG. 3 is an enlarged diametrical, cross-sectional view of my shaft seal, drawn to substantially three-times scale for a 1-inch shaft.

With reference to the drawings, my shaft seal is illustrated by the reference character 10 and is adapted to effect a fluid seal between a shaft 11 and a surrounding body 12, which may comprise a flange or wall of a fluid pressure device. The shaft seal is responsive to fluid, under pressure in the fluid pressure device, and the direction at which the pressure is applied against the shaft seal is indicated by the arrows in FIG. 1. As seen best in FIG. 4, the surrounding body 12 has a shaft bore 14 through which the shaft 11 extends. The shaft bore 14 is larger in diameter than the shaft to provide a diametrical clearance 19 therebetween which may reside (depending upon the fluid pressure) in a range from approximately 0.008 to 0.012 inch.

Figure 4:
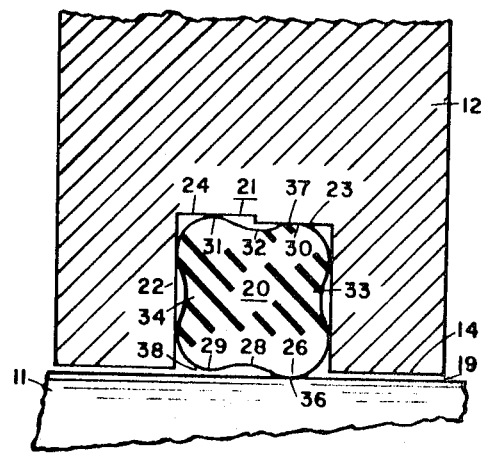
FIG. 4 is an enlarged fragmentary view of FIG. 3, showing the relationship of the O-ring with respect to the shaft and groove.

The shaft seal comprises an O-ring 20 having substantially a square cross section and is adapted to be mounted in a space extending outwardly from the shaft. The space is defined by body wall means which include at least bottom wall means 21 and downstream sidewall means 22. As shown in FIG. 4, the bottom wall means has first and second bottom wall portion means 23 and 24. The first bottom wall portion means 23 defines with said shaft 11 a first perpendicular depth and the second bottom wall portion means 24 defines with said shaft 11 a second perpendicular depth which is greater than said first perpendicular depth by an amount preferably in the neighborhood of approximately 0.013 inch.

The O-ring 20 is preferably composed of rubberlike material and has an internal annular surface confronting the shaft 11 and an external annular surface confronting the bottom wall means. The internal annular surface is provided with first and second raised crown portions 26 and 29 with a valley portion 28 therebetween. The external annular surface is provided with third and fourth raised crown portions 30 and 31 with a valley portion 32 therebetween. The O-ring defines a first end section 33 between the first and third crown portions and a second end section 34 between the second and fourth crown portions. For a 1-inch shaft, the internal freestate diameter of the first and second crown portions 26 and 29 is preferably in the neighborhood of approximately 1.049 inch. For other size shafts, substantially the same oversize relation holds true. The first end section 33 constitutes a sealing section and has a freestate cross-sectional dimension between the first and third crown portions 26 and 30 greater than the first perpendicular depth by an amount which is preferably in the neighborhood of approximately .005 inch. Thus, the first end section 33 is under a state of cross-sectional compression of approximately 0.005 inch. The first crown portion 26 directly confronts and engages the shaft 11 and defines therewith a fluid seal at 36 and the third crown portion 30 directly confronts and engages the first bottom wall portion means 23 and defines therewith a fluid seal at 37.

The second end section 34 constitutes a nonsealing section. Preferably, the freestate external diameter of the fourth crown portion 31 is substantially the same as the diameter of the second bottom wall portion means 24, which means that the nonsealing section is substantially uncompressed, circumferentially. Since the nonsealing section is uncompressed, circumferentially, the internal diameter of the second crown portion 29 remains in substantially a free state which, as previously mentioned, is in the neighborhood of approximately 1.049 inch for a 1-inch shaft. Thus, the second crown portion 29 directly confronts the shaft and provides a nonsealing clearance therearound of approximately $0.049/2\pi$ inch, or about 0.008 inch. The nonsealing clearance is identified by the reference character 38.

The first end section 33 faces the fluid to be sealed and the second end portion 34 faces the down stream sidewall means 22. By reason of the fact that the freestate internal diameter of the second crown portion 29 is larger than the shaft, there is less opportunity for the second crown portion 29 to extrude along the shaft under conditions of high pressure and there is no need for backup washers to prevent extrusion.

For a rotating shaft seal, experience teaches that it is desirable to keep the area of the axial contact which the O-ring makes with the shaft as small as possible to reduce friction and the resultant heat generated. For a given amount of cross-sectional compression, the area of the axial contact is a function of the radius of curvature of the O-ring where it engages the shaft. The square-section type of O-ring has the property of providing a small radius of curvature in contact with the shaft and at the same time of providing a thick radial dimension between opposing crown portions to give a cushion effect. The larger the radial thickness, the less the requirement of accurate machining of the depth of the O-ring groove, because some of the machine tolerance has an opportunity of being absorbed (cushion effect) before it reaches the shaft. The radial or freestate cross-sectional dimension of the O-ring between opposing crown portion is more than twice the radius of curvature of a crown portion where it engages the shaft. The O-ring preferably has a hardness value of at least substantially 80 Durometer. Since the end section 33 is only compressed, the O-ring with a hardness value of at least substantially 80 Durometer may be readily inserted into the groove, whereas, if both end sections were compressed, difficulty may be experienced.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Seal means for effecting a fluid seal between a shaft and a surrounding body, said body having a shaft bore through which said shaft extends, said body having body wall means defining a space extending outwardly from said shaft bore and disposed to receive said seal means, said wall means including bottom wall means having first and second bottom wall portion means, said first bottom wall portion means defining with said shaft a first perpendicular depth, said second bottom wall portion means defining with said shaft a second perpendicular depth, said first perpendicular depth being less than said second perpendicular depth, said seal means comprising an O-ring of rubberlike material having an internal annular surface confronting said shaft and provided with first and second raised crown portions spaced apart from each other and including a valley portion therebetween and having an external annular surface confronting said bottom wall means and provided with third and fourth crown portions spaced apart from each other and including a valley portion therebetween, said O-ring defining a first end section between said first and third crown portions and a second end section between said second and fourth crown portions, said first end section constituting a sealing section and having a freestate cross-sectional dimension between said first and third crown portions greater than said first perpendicular depth whereby said first end section is under a state of cross-sectional compression, said first crown portion directly confronting and engaging said shaft and defining therewith a fluid seal, said second end section constituting a nonsealing section and having a freestate cross-sectional dimension between said second and fourth crown portions less than said second perpendicular depth, said second crown portion directly confronting said shaft and providing a nonsealing clearance therearound.

2. The structure of claim 1, wherein said body wall means also includes downstream sidewall means, said second end section of said O-ring having end wall means facing said downstream sidewall means.

3. The structure of claim 1, wherein said first and third crown portions respectively have freestate diameters greater than the diameters of said shaft and said first bottom wall portion means whereby said first end section of said O-ring between said shaft and said first bottom wall portion means is under a state of circumferential compression.

4. The structure of claim 3, wherein said second bottom wall portion has a diameter substantially the same as the freestate diameter of said fourth crown portion and wherein said second crown portion has a freestate diameter greater than that of said shaft to provide said nonsealing clearance therearound.

5. The structure of claim 1, wherein said O-ring has a cross-sectional dimension more than twice the radius of curvature of a crown portion.

6. The structure of claim 1, wherein said O-ring has a hardness value of at least substantially 80 Durometer.

* * * * *